US012783242B2

(12) United States Patent
Bryson et al.

(10) Patent No.: US 12,783,242 B2
(45) Date of Patent: Nov. 3, 2026

(54) SYSTEMS, METHODS, AND APPARATUS FOR INTERMEDIARY REPRESENTATIONS OF WORKFLOWS FOR COMPUTATIONAL DEVICES

(71) Applicant: Samsung Electronics Co., Ltd., Suwon-si (KR)

(72) Inventors: Matthew Shaun Bryson, Los Gatos, CA (US); Oscar P. Pinto, San Jose, CA (US); Vishwanath Maram, San Jose, CA (US); Seyed Mehdi Bostandoost Nik, Sunnyvale, CA (US); Sainathan Loganathan, Milpitas, CA (US); Wenjie Liu, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 98 days.

(21) Appl. No.: 18/214,522

(22) Filed: Jun. 26, 2023

(65) Prior Publication Data

US 2024/0220266 A1 Jul. 4, 2024

Related U.S. Application Data

(60) Provisional application No. 63/436,099, filed on Dec. 29, 2022.

(51) Int. Cl.
*G06F 9/38* (2018.01)
*G06F 9/30* (2018.01)

(52) U.S. Cl.
CPC ........ *G06F 9/3836* (2013.01); *G06F 9/30043* (2013.01)

(58) Field of Classification Search
CPC .......... G06F 8/40; G06F 8/41; G06F 9/30043; G06F 9/3836; G06F 9/455
See application file for complete search history.

(56) References Cited

U.S. PATENT DOCUMENTS 6,581,154 B1 * 6/2003 Zaidi ........................ G06F 9/382 712/210
6,820,258 B1 * 11/2004 Fink ........................ G06F 8/443 717/158

(Continued)

OTHER PUBLICATIONS

Deelman, Ewa et al., "Workflows and e-Science: An Overview of Workflow System Features and Capabilities," Future Generation Computer Systems, vol. 25, No. 5, May 2009, pp. 528-540.

(Continued)

*Primary Examiner* — Jacob Petranek
(74) *Attorney, Agent, or Firm* — Renaissance IP Law Group LLP

(57) ABSTRACT

A method may include receiving, by at least one processing circuit, an input representation of a computational workflow, wherein the input representation may include at least one instruction in an input format, and generating, by the at least one processing circuit, based on the input representation, an intermediary format representation of the computational workflow, wherein the intermediary format representation may include at least one intermediary format instruction for a computational device. The at least one intermediary format instruction may include an instruction to perform, by the computational device, at least one of a load operation, a store operation, or a computational operation. The generating the intermediary format representation may include generating the intermediary format representation based on an arrangement of the computational workflow.

20 Claims, 9 Drawing Sheets

(56) References Cited

U.S. PATENT DOCUMENTS

| | | | |
|---|---|---|---|
| 7,631,291 B2 | 12/2009 | Shukla et al. | |
| 8,250,524 B2 * | 8/2012 | Barnett | G06F 8/51 717/110 |
| 8,429,527 B1 | 4/2013 | Arbogast | |
| 8,584,105 B1 * | 11/2013 | Epshteyn | G06F 9/45529 717/146 |
| 9,594,578 B2 | 3/2017 | Kannan | |
| 10,452,360 B1 | 10/2019 | Burman et al. | |
| 2003/0167460 A1 * | 9/2003 | Desai | G06F 9/3853 712/E9.034 |
| 2005/0071834 A1 * | 3/2005 | Gates | G06F 8/443 717/127 |
| 2007/0156486 A1 | 7/2007 | Sanabria et al. | |
| 2017/0177343 A1 * | 6/2017 | Lai | G06F 9/3016 |
| 2017/0249144 A1 * | 8/2017 | Jaget | G06F 9/3824 |
| 2019/0042217 A1 * | 2/2019 | Glossop | G06F 8/441 |
| 2019/0197448 A1 | 6/2019 | Nelaturi et al. | |
| 2019/0324755 A1 | 10/2019 | Herr et al. | |
| 2020/0387438 A1 * | 12/2020 | Carrington | G06F 11/3404 |
| 2021/0014113 A1 | 1/2021 | Bernat et al. | |
| 2021/0096903 A1 | 4/2021 | Sodagar | |
| 2021/0397976 A1 | 12/2021 | Kadohira et al. | |
| 2022/0305735 A1 | 9/2022 | Cella et al. | |
| 2022/0318928 A1 * | 10/2022 | Pedone | G06Q 40/12 |
| 2022/0334879 A1 | 10/2022 | Vishnuswaroop Ramesh et al. | |

OTHER PUBLICATIONS

Eshuis, Rik et al., "Verification Support for Workflow Design with UML Activity Graphs," Proceedings of the 24th International Conference on Software Engineering, May 2002, pp. 166-176.

European Extended Search Report for Application No. 23220274.7, mailed Mar. 7, 2024.

* cited by examiner

SYSTEMS, METHODS, AND APPARATUS FOR INTERMEDIARY REPRESENTATIONS OF WORKFLOWS FOR COMPUTATIONAL DEVICES

REFERENCE TO RELATED APPLICATION

This application claims priority to, and the benefit of, U.S. Provisional Patent Application Ser. No. 63/436,099 filed Dec. 29, 2022 which is incorporated by reference.

TECHNICAL FIELD

This disclosure relates generally to computational devices, and more specifically to systems, methods, and apparatus for intermediary representations of workflows for computational devices.

BACKGROUND

A computational device such as an accelerator or a computational storage device may include one or more computational resources that may perform operations on data. A host may offload a processing task to a computational device, for example, by sending data and/or one or more commands to the computational device. The computational device may perform the processing task, for example, using the data and/or one or more computational resources.

The above information disclosed in this Background section is only for enhancement of understanding of the background of the inventive principles and therefore it may contain information that does not constitute prior art.

SUMMARY

A method may include receiving, by at least one processing circuit, an input representation of a computational workflow, wherein the input representation may include at least one instruction in an input format, and generating, by the at least one processing circuit, based on the input representation, an intermediary format representation of the computational workflow, wherein the intermediary format representation may include at least one intermediary format instruction for a computational device. The at least one intermediary format instruction may include an instruction to perform, by the computational device, at least one of a load operation, a store operation, or a computational operation. The generating the intermediary format representation may include generating the intermediary format representation based on an arrangement of the computational workflow. The input representation may be a first input representation, the input format may be a first input format, and the method may further include receiving, by the at least one processing circuit, a second input representation of the computational workflow, wherein the second input representation may include at least one instruction in a second input format, and generating, by the at least one processing circuit, based on the second input representation, the intermediary format representation of the computational workflow.

A method may include receiving, by at least one processing circuit, an intermediary format representation of a workflow for a computational device, wherein the intermediary format representation may include at least one intermediary format instruction, and executing, by the at least one processing circuit, the intermediary format representation. The executing the intermediary format representation may include generating, based on the intermediary format representation, a device format instruction. The method may further include executing, by the computational device, the device format instruction. The method may further include sending the device format instruction to the computational device. The at least one processing circuit may include an execution apparatus at the computational device, and the executing the intermediary format representation may include executing, by the execution apparatus, at least one of the at least one intermediary format instruction. The executing the intermediary format representation may include communicating using an application programming interface for the computational device. The executing the intermediary format representation may include modifying the intermediary format instruction based on an application programming interface for the computational device. The executing the intermediary format representation may include processing the intermediary format instruction. The processing the intermediary format instruction may include generating, based on the intermediary format instruction, a device format instruction. The processing the intermediary format instruction may further include sending the device format instruction to the computational device. The executing the intermediary format representation may include executing the intermediary format representation based on an arrangement of the workflow. The executing the intermediary format representation may include performing at least one of a load operation, a store operation, or a computational operation. The at least one processing circuit may be at least one first processing circuit, and the method may further include receiving, by at least one second processing circuit, the intermediary format representation of the workflow for a computational device, wherein the intermediary format representation may include at least one intermediary format instruction, and executing, by the at least one second processing circuit, the intermediary format representation. The executing, by the at least one first processing circuit, the intermediary format representation may provide a result, and the executing, by the at least one first processing circuit, the intermediary format representation may provide the result.

An apparatus may include a computational device that may include a communication interface, and at least one computational resource, wherein the computational device may be configured to receive, by the communication interface, an intermediary format instruction, and execute, at least in part, by the at least one computational resource, the intermediary format instruction. The computational device may be configured to generate, based on the intermediary format instruction, at least one device format instruction, and the computational device may be configured to execute, at least in part, the intermediary format instruction by executing, at least in part, the device format instruction.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
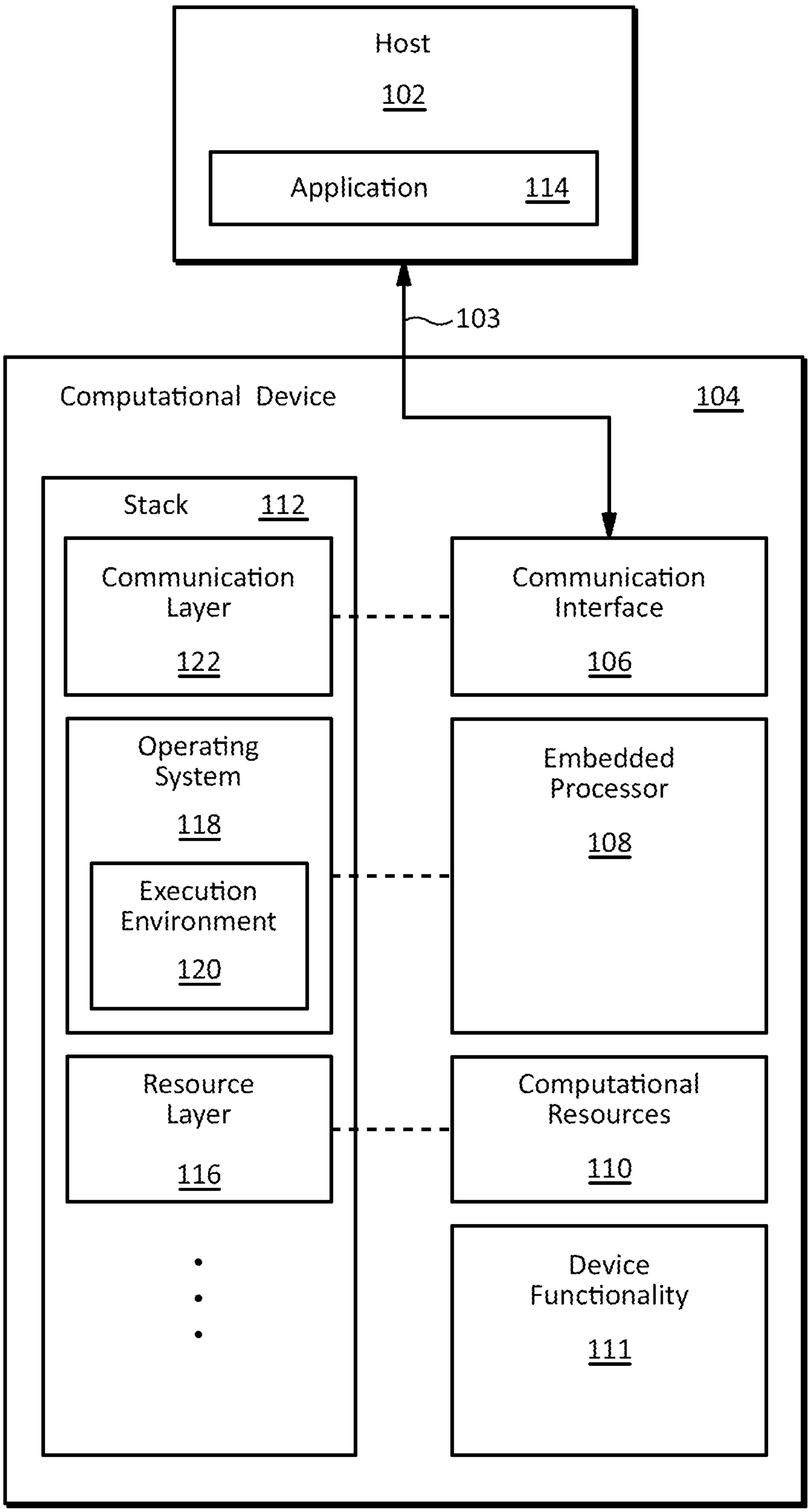
FIG. 1 illustrates an embodiment of a computational system in accordance with example embodiments of the disclosure.

Computational devices such as accelerators, computational storage devices, and/or the like, may include one or more computational resources that may be used, for example, to perform processing tasks that may be offloaded from a host. However, using a computational device for a specific workflow may involve the use of technologies across multiple domains such as one or more technologies of the computational device itself, one or more technologies to which a computational resource may be applied (e.g., a field of use technology), one or more programming technologies that may be used to implement a workflow, and/or the like.

For example, using a computational device for a workflow may involve a technology of a computational resource such as a field programmable gate array (FPGA) located at the computational device, a technology of an embedded operating system running on the computational device, and/or a technology of an application programming interface (API) for the computational device.

As another example, using a computational device for a workflow may involve one or more technologies to which computational resources may be applied such as machine learning, video processing, database operations, graph processing, and/or the like.

As a further example, using a computational device for a workflow may involve one or more programming technologies such as programming languages, frameworks, APIs, libraries, development environments, and/or the like. Thus, using a computational device may involve implementing, coordinating, synchronizing, integrating, and/or the like, multiple technologies across multiple domains. Depending on the implementation details, this may involve a significant investment of time, computing resources, and/or the like.

Moreover, migrating a computational workflow from a first computational device to a second computational device may involve implementing, coordinating, synchronizing, and/or the like, one or more additional technologies, for example, to modify and/or rewrite code written for the first computational device to operate with the second computational device (which may not be interoperable with the first computational device). Depending on the implementation details, this may involve an additional investment of time, computing resources, and/or the like.

A scheme in accordance with example embodiments of the disclosure may use an intermediary format (IF) representation of a workflow for a computational device. In some embodiments, an intermediary format and/or IF language may be implemented as a control language to control one or more computational resources (which may be implemented with hardware, software, or a combination thereof) and/or to control one or more software stacks for one or more computational resources. In some embodiments, an intermediary format and/or IF language may include a set of one or more instructions such as load, store, execute, and/or the like, that may control one or more computational resources and/or software stacks.

For example, in some embodiments, an input representation of a workflow for a computational device may include one or more instructions written in one or more input languages. The input representation may be converted to an IF representation of the workflow. An IF representation of a workflow may include, for example, one or more instructions written in the intermediary format. An IF representation of a workflow may be used to execute the workflow on a computational device in various and unlimited ways.

For example, in some embodiments, an IF representation of a workflow may be converted (e.g., compiled) to a representation (e.g., a native representation) that may be used to configure a computational device, execute the workflow with the computational device, and/or the like. As another example, an IF representation of a workflow may be converted to a format that may execute the workflow using an API for a computational device. As a further example, an IF representation of a workflow may be applied as an input to an interpreter that may use the intermediary format as an interpreted language. As an additional example, an IF representation of a workflow may be executed, at least partially, by hardware (e.g., directly by hardware) that may be configured to read and/or execute one or more IF instructions.

In some embodiments, an IF representation of a workflow may include instructions that may be generic (e.g., not specific) to one or more entities (e.g., APIs, hardware, software, execution environments, and/or the like) that may execute some or all of the workflow. Depending on the implementation details, this may improve an interface (hardware, software, and/or combination thereof) to a computational device, for example, by reducing the number of technologies that may be implemented, coordinated, synchronized, integrated, and/or the like, to use one or more computational devices for one or more applications. In some embodiments, and depending on the implementation details, the use of an IF representation of a workflow may reduce an investment of time, computing resources, and/or the like, to use a computational device, may improve the portability of a workflow from a first computational device to a second computational device, may reduce one or more barriers to the use of computational devices, and/or may provide computational devices and/or converters, compilers, interpreters, APIs, execution environments, programming stacks, and/or the like for computational devices that may be configured to run one or more (e.g., any) IF representations of workflows that may be generated by any source. Thus, depending on the implementation details, the use of an IF representation of a workflow may enable interoperability of workflows from one or more sources (e.g., any source) with computational devices from one or more sources (e.g., any source).

This disclosure encompasses numerous inventive principles relating to intermediary representations of workflows for computational devices. The principles disclosed herein may have independent utility and may be embodied individually, and not every embodiment may utilize every principle. Moreover, the principles may also be embodied in various combinations, some of which may amplify some benefits of the individual principles in a synergistic manner.

For purposes of illustration, some embodiments may be described in the context of some specific implementation details such as specific programming language, types and/or numbers of computational devices, computational resources (e.g., FPGAs, embedded processors, and/or the like), computational device APIs, and/or the like. However, the principles are not limited to these or any other implementation details. In some embodiments, a computational device may refer to one or more computational devices and/or one or more portions thereof. In some embodiments, a computational device may refer to one or more computational resources.

FIG. 1 illustrates an embodiment of a computational system in accordance with example embodiments of the disclosure. The system illustrated in FIG. 1 may include a host 102 and a computational device 104 that may communicate through a communication connection 103. The computational device 104 may include a communication interface 106, an embedded processor 108, one or more computational resources 110, and/or a device functionality circuit 111. The computational device 104 may enable one or more computational tasks to be offloaded from the host 102 (e.g., from an application 114 running on the host 102) to the one or more computational resources 110.

In some embodiments, the one or more computational resources 110 may include combinational logic, sequential logic, one or more timers, counters, registers, and/or state machines, one or more complex programmable logic devices (CPLDs), FPGAs, application specific integrated circuits (ASICs), central processing units (CPUs) such as complex instruction set computer (CISC) processors (e.g., x86 processors) and/or reduced instruction set computer (RISC) processors such as ARM processors, graphics processing units (GPUs), neural processing units (NPUs), tensor processing units (TPUs), data processing units (DPUs), and/or a combination thereof.

In some embodiments, using the one or more computational resources 110 may involve using some or all of a software stack 112. For example, if the one or more computational resources 110 includes an FPGA, the software stack 112 may include a resource layer 116 (e.g., a high-level synthesis (HLS) and/or RTL layer) that may implement some or all of the operations of the FPGA. In some embodiments, the software stack 112 may include a layer that may be implemented as an operating system 118 (e.g., embedded Linux) that may run on the embedded processor 108 and/or may provide a platform for computational functions, programs, and/or the like that may use the one or more computational resources 110.

In some embodiments, the device functionality circuit 111 may include hardware and/or software resources to implement a primary function of the computational device 104. For example, if the device 104 is implemented as a storage device, the device functionality circuit 111 may include a storage medium such as one or more flash memory devices, a flash translation layer (FTL), and/or the like. As another example, if the device 104 is implemented as a network interface card (NIC), the device functionality circuit 111 may include one or more modems, network interfaces, physical layers (PHYs), medium access control layers (MACs), and/or the like. As a further example, if the device 104 is implemented as an accelerator, the one or more computational resources 110 may essentially form the device functionality circuit 111. Additionally, or alternatively, if the device 104 is implemented as an accelerator, the device functionality circuit 111 may include one or more additional computational resources.

In some embodiments, the software stack 112 may include an execution environment 120 (e.g., an execution environment such as Extended Berkeley Packet Filter (eBPF)) that may be implemented, for example, within the operating system 118 (e.g., in a kernel space of the operating system). An execution environment 120 may be used, for example, to provide a protected environment within the operating system 118 in which to run computational functions, programs, and/or the like that may be provided by a user (e.g., an application 114 running on the host 102). In some embodiments, the software stack 112 may include a communication layer 122 that may implement one or more communication interfaces, protocols, and/or the like such as Peripheral Component Interconnect Express (PCIe), Nonvolatile Memory Express (NVMe), Compute Express Link (CXL), Ethernet, NVMe over Fabric (NVMe-oF), Transmission Control Protocol/Internet Protocol (TCP/IP), and/or the like, to enable the host 102 and/or an application 114 running on the host 102 to communicate with the computational device 104. In some embodiments, the software stack 112 may include one or more additional layers, for example, for the device functionality circuit 111.

Thus, in some embodiments, configuring and/or programming an application 114 running on the host 102 to use the one or more computational resources 110 may involve configuring, using, programming, and/or the like, any or all of the layers of the software stack 112. Depending on the implementation details, this may increase the difficulty and/or investment of time and/or other resources associated with using a computational device 104. Moreover, configuring and/or programming an application 114 may involve coordinating, synchronizing, integrating, and/or the like, one or more technologies used in the computational device 104 and/or one or more computational resources 110 with one or more technologies to which computational resources 110 may be applied such as machine learning, video processing, database operations, graph processing, and/or the like. Depending on the implementation details, this may involve a significant investment of time, computing resources, and/or the like.

Figure 2:
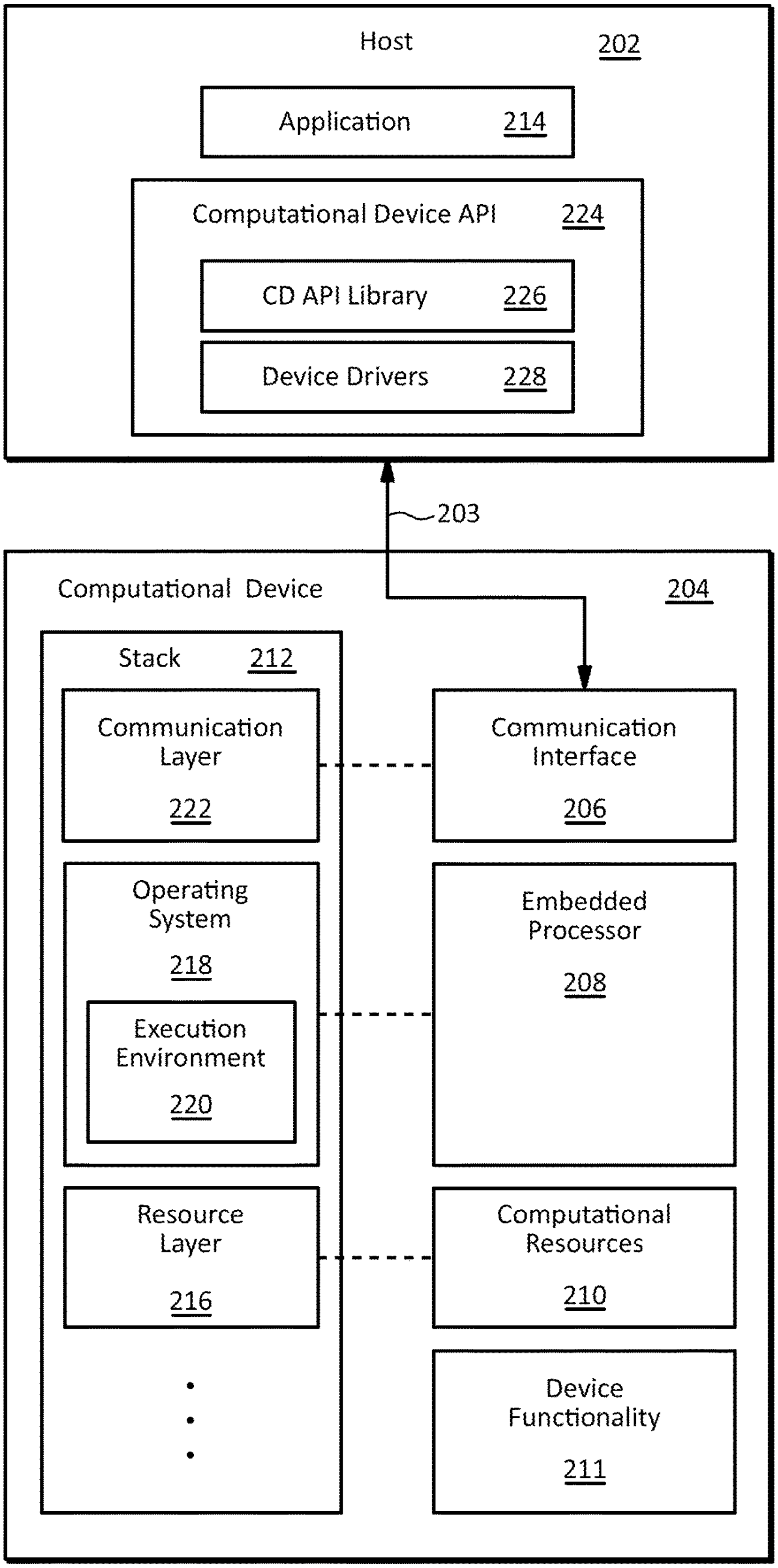
FIG. 2 illustrates an embodiment of a computational system having an application programming interface in accordance with example embodiments of the disclosure.

FIG. 2 illustrates an embodiment of a computational system having an application programming interface in accordance with example embodiments of the disclosure. The system illustrated in FIG. 2 may include a host 202 and a computational device 204 that may communicate through a communication connection 203. The computational device 204 may include one or more components and/or a software stack 212 similar to those illustrated in the system illustrated in FIG. 1 in which similar elements may be indicated by reference numbers ending in the same digits. However, the system illustrated in FIG. 2 may implement a computational device API (CD API) 224 that an application 214 running on the host 202 may use to access the one or more computational resources 210.

For example, the computational device API 224 may include a computational API library 226 that may implement one or more API calls to execute one or more computational functions, programs, and/or the like that may use the one or more computational resources 210. The computational device API 224 may include one or more device drivers 228 that may perform relatively low-level operations, for example, handling communications with the computational device 204. Although the computational device API 224 is illustrated at the host 202, in some embodiments, the computational device API 224 may be implemented partially or entirely at the computational device 204.

Depending on the implementation details, the computational device API 224 may provide a relatively simple interface between the application 214 and the computational device, for example, by shielding the application 214 from the complexity, burden, and/or the like of configuring, using, programming, and/or the like, any or all of the layers of the software stack 212.

However, in some implementations, a computational device API 224 may still be relatively complex and/or burdensome for an application to use. Moreover, in some embodiments, a computational device API 224 may be implemented for the specific computational device 204 and/or type thereof, and/or the one or more computational resources 210 and/or type thereof. Thus, an application 214 that may be written to use the computational device API 224 to implement a computational workflow may not be portable to a different computational device and/or computational device API. Additionally, configuring and/or programming an application 214 may involve coordinating, synchronizing, integrating, and/or the like, one or more technologies used in the API 224, the computational device 204 and/or one or more computational resources 210 with one or more technologies to which computational resources 210 may be applied such as machine learning, video processing, database operations, graph processing, and/or the like. Depending on the implementation details, this may involve a significant investment of time, computing resources, and/or the like.

Figure 3:
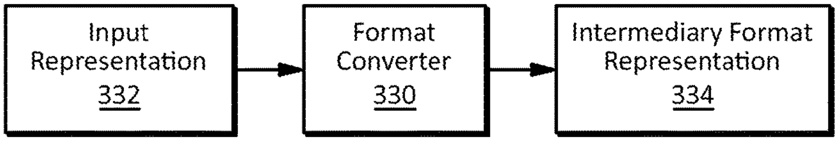
FIG. 3 illustrates an embodiment of a scheme for generating an intermediary format representation of a workflow for a computational device in accordance with example embodiments of the disclosure.

FIG. 3 illustrates an embodiment of a scheme for generating an intermediary format representation of a workflow for a computational device in accordance with example embodiments of the disclosure.

The embodiment illustrated in FIG. 3 may include a format converter 330 that may receive an input representation of a computational workflow 332. The input representation may be in any format that may be useful, convenient, and/or the like, for representing a workflow for a computational device. For example, an input representation of a computational workflow may be in a programming language such as C, Python, Java, JavaScript, and/or the like, a workflow language such as Common Workflow Language (CWL), Yet Another Workflow Language (YAWL), Cuneiform, JavaScript Object Notation for Linked Data (JSON-LD), and/or the like. An input representation of a computational workflow may be received, for example, as a file, a bitstream, stored in a memory buffer, and/or the like.

In some embodiments, a workflow may involve configuring one or more computational devices and/or computational resources, transferring data to and/or from one or more computational devices and/or computational resources, scheduling and/or using one or more computational devices and/or computational resources to perform one or more operations on data, and/or the like. In some embodiments, a workflow for a computational device may be referred to as a computational workflow or a workflow. In some embodiments, an IF representation of a workflow may be referred to as an IF representation, an IF, IF code, and/or the like.

The format converter 330, which may also be referred to as a translator or transpiler, may convert the input representation of a computational workflow 332 to an IF representation of the workflow 334. In some embodiments, an IF representation may include one or more IF instructions that may include for example, declarations, statements, procedures, functions, subroutines, programs, variables, constants, types, structures, opcodes, mnemonics, and/or the like, that may specify one or more configurations, inputs, outputs, operations, and/or the like, for a computational device.

In some embodiments, one or more IF instructions may be generic (e.g., not specific) to one or more entities (e.g., APIs, hardware, software, execution environments, and/or the like) that may execute some or all of the workflow. Thus, depending on the implementation details, an IF representation of a computational workflow may be portable between (e.g., usable by) different entities that may execute some or all of the workflow, in some instances, without changes to the IF representation. An IF representation of a computational workflow may be output, for example, as a file, a bitstream, stored in a memory buffer, and/or the like.

Figure 4:
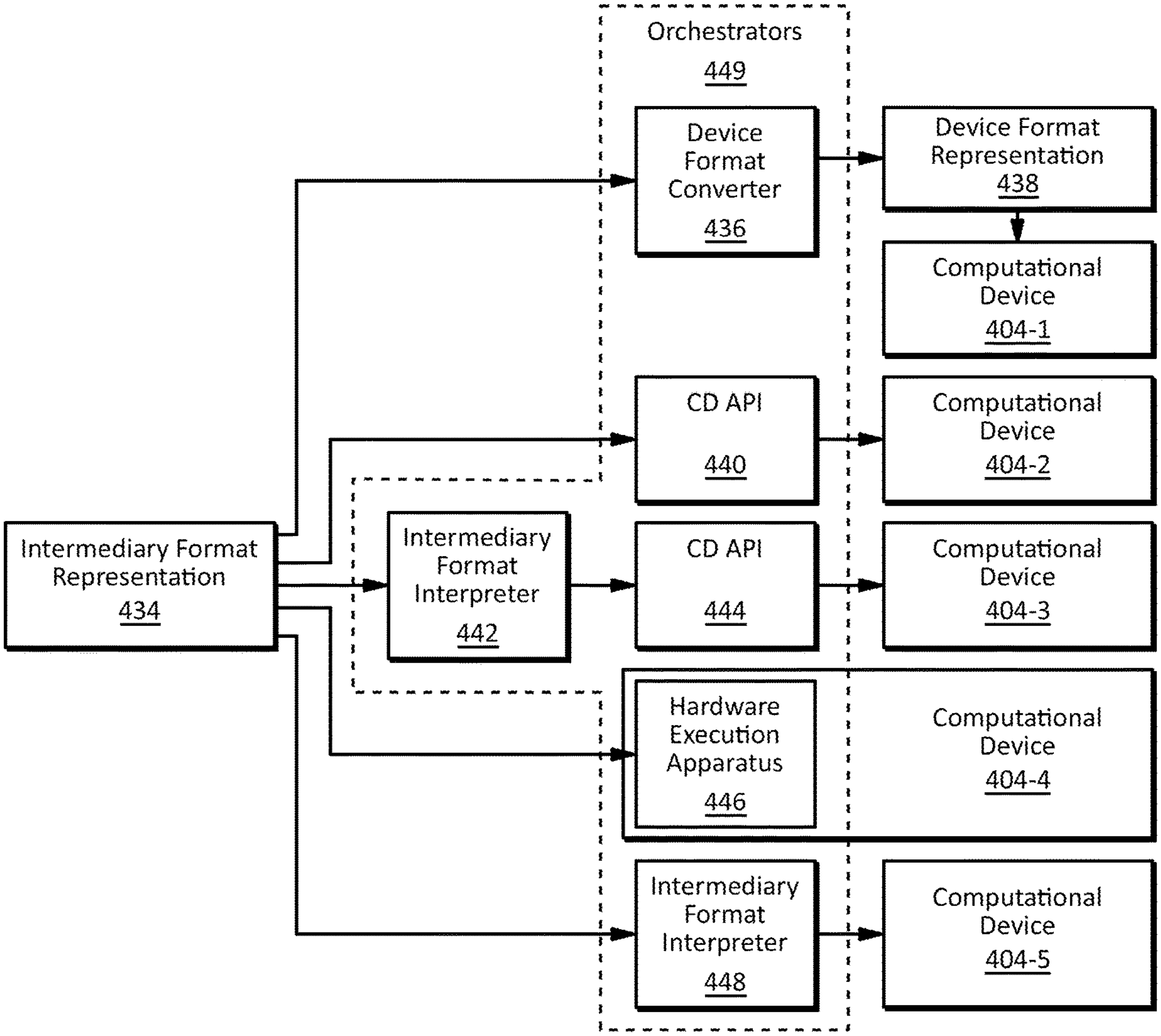
FIG. 4 illustrates an embodiment of a scheme for using an intermediary format representation of a workflow for a computational device in accordance with example embodiments of the disclosure.

FIG. 4 illustrates an embodiment of a scheme for using an intermediary format representation of a workflow for a computational device in accordance with example embodiments of the disclosure. The embodiment illustrated in FIG. 4 may receive an intermediary format representation of a workflow 434 that may be generated, for example, by a format converter such as the format converter 330 illustrated in FIG. 3.

In some embodiments, the scheme illustrated in FIG. 4 may include a device format converter 436 that may convert an IF representation of a workflow 434 to a device format representation 438 (e.g., a native representation) that may be used to configure a computational device, execute the workflow with a computational device, and/or the like. For example, to execute the workflow 434 using a computational device that includes an FPGA, the device format converter 436 may convert (e.g., compile) some or all of the IF representation 434 to a native representation that may include register-transfer level (RTL) code that may be used to configure the FPGA and/or may be used by the FPGA to perform one or more computational operations. Additionally, or alternatively, the device format converter 436 may convert (e.g., compile) some or all of the IF representation 434 to a format that may be used by an operating system, execution environment, and/or the like, running on an embedded processor at a computational device. In some embodiments, the device format converter 436 may be implemented, for example, as a compiler or a transpiler.

In some embodiments, a provider (e.g., manufacturer, reseller, system integrator, and/or the like) of a computational device may also provide a device format converter 436 that may be used to convert an IF representation of a workflow 434 to a device format representation (e.g., using a device format and/or provider format) of the workflow 438. Thus, in some embodiments, different providers of different computational devices may provide different device format converters 436 to convert an IF representation of a workflow 434 to a device format representation 438 for a respective computational device 404-1. In some embodiments, a provider or a third party may provide a converter that may convert an IF representation of a workflow 434 to one or more device format representations 438 for one or more computational devices.

Additionally, or alternatively, the scheme illustrated in FIG. 4 may include a CD API 440 that may receive an IF representation of a workflow 434 as an input to the CD API 440. In some embodiments, the CD API 440 may provide an interface to one or more computational devices 404-2 that may be compatible with, supported by, and/or the like, the CD API 440. In one or more such embodiments, the CD API 440 may be configured to operate (e.g., directly) in response to an IF representation of a workflow 434. In some embodiments, a CD API 440 may be implemented at a host, a computational storage device, any other location, or a combination thereof.

In some embodiments, a provider of a computational device may also provide a CD API 440 that may use an IF representation of a workflow 434 to operate one or more computational devices 404-2. Thus, in some embodiments, different providers of different computational devices may provide different APIs 440 to provide an interface to one or more respective computational devices. In some embodiments, a provider or a third party may provide an API that may provide an interface to one or more different computational devices.

Additionally, or alternatively, the scheme illustrated in FIG. 4 may include an IF interpreter 442 that may enable an API 444 to use an IF representation of a workflow 434 as an input to operate one or more computational devices 404-3. Depending on the implementation details, an IF interpreter 442 may enable an API intended for a different type of input (e.g., an existing API such as a computational storage API (CS API)) to be used with an IF representation of a workflow 434. For example, an IF interpreter 442 may execute a workflow by processing one or more (e.g., a stream) of IF instructions (e.g., in real time) from an IF representation of the workflow. In some embodiments, an IF interpreter 442 may be implemented at a host, a computational device, any other location, or a combination thereof. For example, a framework for a computational device may include an API library that may be called by an application running on a host to use the computational device. Thus, an IF interpreter 442 may enable an application, a process, and/or the like, running on a host, a computational device, or a combination thereof, to execute an IF representation of a workflow 434 by making one or more calls to the API library for the computational device.

Additionally, or alternatively, the scheme illustrated in FIG. 4 may include hardware execution apparatus 446 that may execute (e.g., directly), at least partially, an IF representation of a workflow 434. For example, hardware execution apparatus 446 may be configured to read and/or execute one or more IF instructions, for example, using hardwired circuitry, one or more state machines, microcode, and/or the like. In some embodiments, the hardware execution apparatus 446 may be located at least partially at a computational device 404-4.

Additionally, or alternatively, the scheme illustrated in FIG. 4 may include an IF interpreter 448 that may use the intermediary format of the IF representation 434 as an interpreted language. For example, an IF interpreter may run on a host and/or a computational device and execute a workflow by processing a stream of IF instructions (e.g., in real time) from an IF representation of the workflow. In some embodiments, an IF interpreter may be implemented as an IF virtual machine. In some embodiments, an IF interpreter may execute one or more computational tasks at, and/or offload one or more computational tasks to, a computational device 404-5 and/or a computational resource based on one or more IF instructions, for example, by sending native instructions to a computational device 404-5 and/or a computational resource, accessing an API for a computational device and/or a computational resource, running code on an embedded operating system on a computational device, and/or the like.

In some embodiments, any of the techniques for executing an IF representation of a computational workflow described herein (e.g., illustrated in FIG. 4) may be referred to as orchestrating a workflow. In some embodiments, any of the systems, apparatus, and/or the like, described herein (e.g., illustrated in FIG. 4 including any of the compilers, APIs, adapters, hardware implementations, interpreters, and/or corresponding computational devices and/or computational resources) for executing an IF representation of a workflow, whether implemented in hardware, software, or a combination thereof, may be referred to as orchestrators 449.

In some embodiments, any of the computational devices 404 (e.g., 404-1, 404-2, . . . ) may be implemented, for example, at least in part using devices such as devices 104 and/or 204 illustrated in FIG. 1 and/or FIG. 2, respectively.

Depending on the implementation details, the use of an IF representation of a workflow in accordance with example embodiments of the disclosure may enable the creation of a computational workflow to be separated, at least partially, from an execution of the workflow. For example, referring to FIG. 3 and FIG. 4, a workflow 332 to perform video processing may be written in a relatively high level programming language (e.g., Python) and converted (e.g., by a format converter 330) to an IF representation 334 (and/or 434). To execute the video processing workflow using a computational device that includes an FPGA, the IF representation of the workflow 434 may be converted (e.g., by a device format converter 436) to a native representation 438 that may include high-level synthesis (HSL) instructions, register-transfer level (RTL) code, and/or the like, that may be used by the FPGA to perform one or more computational operations.

In accordance with example embodiments of the disclosure, a video processing workflow 332 may be migrated to a computational device that includes an embedded ARM processor, for example, by compiling (e.g., using a device format converter 436) the IF representation of the video processing workflow 434 to a native representation 438 such as ARM assembly language and/or machine code that may be executed by the ARM processor. Thus, depending on the implementation details, the video processing workflow may be migrated from one type of computational device to another type of computational device with little or no rewriting of the original input code and/or the IF representation.

As another example, referring to FIG. 3 and FIG. 4, a video processing workflow 332 written in Python and converted (e.g., by a format converter 330) to an IF representation 334 (and 434) may be migrated to a format that may execute the workflow using a CD API 440 for a computational device. For example, an IF representation of a video processing workflow 434 may be converted (e.g., modified, for example, by an adapter 442) to an application, a process, and/or the like, running on a host and/or a computational device, that may execute the workflow by making one or more calls to an API library for the computational device. Thus, depending on the implementation details, the video processing workflow 332 may be migrated from a native implementation on a computational device to an API implementation with little or no rewriting of the original input code and/or the IF representation.

Figure 5:
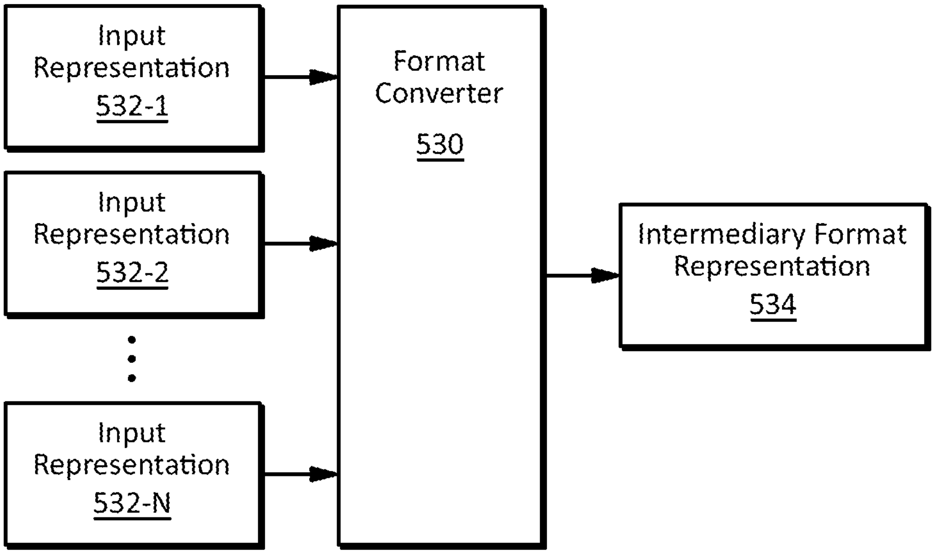
FIG. 5 illustrates an embodiment of a scheme for generating an intermediary format representation of a workflow for a computational device in accordance with example embodiments of the disclosure.

FIG. 5 illustrates an embodiment of a scheme for generating an intermediary format representation of a workflow for a computational device in accordance with example embodiments of the disclosure. The embodiment illustrated in FIG. 5 may include one or more elements similar to those illustrated in the system illustrated in FIG. 3 and/or FIG. 4 in which similar elements may be indicated by reference numbers ending in the same digits. However, in the embodiment illustrated in FIG. 5, the format converter 530 may receive any number (N) of input representations 532-1, . . . , 532-N of a computational workflow. Any of the input representations 532-1, . . . , 532-N may be in any format and/or language that may be supported by the format converter 530. In some embodiments, the format converter 530 may convert one or more (e.g., any) of the input representations 532-1, . . . , 532-N to an IF representation 534 of the workflow. The IF representation 534 of the workflow may be executed, for example, using any type of orchestrator including any of the orchestrators illustrated in FIG. 4.

Depending on the implementation details, the format converter 530 may generate an IF representation 534 of the workflow that may be the same or similar, or provide the same or similar results when executed, regardless of the format and/or language of the input representation 532-1, . . . , 532-N of the workflow. Thus, in some embodiments, and depending on the implementation details, one or more users (e.g., programmers) may use different input formats and/or languages to create one or more workflows that the format converter 530 may convert to IF representations that may provide the same or similar results. Moreover, in some embodiments, and depending on the implementation details, the one or more IF representations created by the format converter 530 based on the one or more the input representation 532-1, . . . , 532-N of the workflow may be executed by one or more different orchestrators (e.g., any of the different orchestrators illustrated in FIG. 4) that may produce the same or similar results. Thus, in some embodiments, the inventive principles may provide improved flexibility in the creation and/or execution of workflows for computational devices, for example, by implementing a generalized intermediary format that may enable a computational workflow to provide the same or similar results regardless of the user, language, format, and/or the like used to create the workflow, and/or regardless of the orchestrator, computational device, computational resources, and/or the like used to execute the workflow.

In some embodiments, an intermediary format may be implemented at least partially with an intermediary format language (IF language). For example, an IF language may provide a format for storing, using, and/or the like, all or a portion of one or more computational workflows which may be directed, for example to one or more application domains (e.g., technologies) such as machine learning, video processing, database operations, graph processing, and/or the like, and may use resources in one or more computational domains (e.g., technologies) such as FPGAs, ASICs, embedded processors, state machines, CPLDs, CPUs, GPUs, NPUs, TPUs, DPUs, and/or the like.

In some embodiments, an intermediary format and/or IF language may be relatively clear, unambiguous, simple, straightforward, and/or the like, for an orchestrator (e.g., a compiler, API, adapter, interpreter, hardware execution apparatus, and/or corresponding computational devices and/or computational resources) to interpret, implement, and/or the like.

In some embodiments, an intermediary format and/or IF language may be interpreted by an orchestrator in a manner that may enable adjustment (e.g., optimization) and/or scheduling of one or more computational storage workflows. For example, an intermediary format may establish one or more dependencies in one or more different workflows, programs, processes, and/or the like. In some embodiments, a dependency may be based on an arrangement (e.g. sequence, order, and/or the like) of operations. Thus, if a first workflow, program, process, and/or the like stalls due to a dependency (e.g., waiting to receive data from a direct memory access (DMA), a load from storage, and/or the like before performing an operation on the data), an orchestrator may execute a second workflow, program, process, and/or the like while the first one is stalled. In some embodiments, an orchestrator may use a round robin algorithm and/or any other type of algorithm to schedule one or more workflows, programs, processes, and/or the like, e.g., in an interleaved manner. As a further example, an intermediary format may establish one or more dependencies that may enable an orchestrator (e.g., a compiler) to eliminate code that may not be called, eliminate variables that may not be read, and/or the like.

In some embodiments, an intermediary format and/or IF language may provide a load interface (e.g., a general load interface) that may enable a workflow to specify one or more load operations that may not depend on an underlying data format, memory, and/or storage technology, and/or the like. For example, an orchestrator may implement an IF language by providing a generic load instruction that may shield the workflow from the implementation details (e.g., hardware and/or software) of an underlying key-value store, key-value storage device, file system, database, and/or the like. Thus, an IF representation of a workflow may run correctly on different orchestrators that may implement different data formats, memory, and/or storage systems, and/or the like.

In some embodiments, an intermediary format and/or IF language may enable an orchestrator to exercise full or partial control of memory such as host memory, device memory, and/or the like. For example, an orchestrator may clean up (e.g., deallocate) host and/or device memory used by a workflow, for example, after a workflow has completed execution. In some embodiments, an orchestrator may not clean up one or more portions of memory used by a workflow, for example, a portion of host memory (e.g. one or more user-defined output buffers) in which one or more results of a workflow may be stored.

In some embodiments, an intermediary format and/or IF language may enable an IF representation of a workflow to implement one or more conditional operations, loop operations, and/or the like. For example, in some embodiments, an IF language may implement one or more conditional operations such as if-then-else statements, case statements, switch statements, match statements (e.g., pattern matching), and/or the like. As another example, in some embodiments, an IF language may implement one or more loop operations such as for operations, while operations, do operations, and/or the like. In some embodiments, an IF language may enable an IF representation of a workflow to implement one or more loop operations as a cyclic loop.

In some embodiments, an intermediary format and/or IF language may enable an IF representation of a workflow to implement graphical directionality (e.g., cyclic and/or acyclic graphical directionality, with or without determinism). For example, in some embodiments, a workflow, program, process, and/or the like, may be represented at least partially as a graph (e.g., an abstract syntax tree (AST)) that may enable an orchestrator (e.g., a compiler, interpreter, and/or the like) to understand an order of execution of one or more workflows, programs, processes, and/or the like.

In some embodiments, an intermediary format and/or IF language may enable an IF representation of a workflow to implement one or more joins such as one or more inner joins, right (outer) joins, left (outer) joins, full joins, and/or multiples thereof.

In some embodiments, an intermediary format and/or IF language may enable an orchestrator to exercise full or partial control of a start, an exit, and/or the like, for a workflow, program, process, and/or the like. In some embodiments, a start, an exit, and/or the like, may be explicitly and/or implicitly specified (e.g., defined).

In some embodiments, an intermediary format and/or IF language may implement one or more data operations. For example, an IF language may implement one or more data movement operations such as load from storage, load from memory (e.g., host memory, device memory, and/or the like), store to memory (e.g., host memory, device memory, and/or the like), store to storage, and/or the like. As another example, an IF language may implement one or more compute operations that may involve, for example, one or more (e.g., N) inputs, one or more (e.g., M) outputs, and/or the like.

In some embodiments, an intermediary format and/or IF language may implement type checking for one or more (e.g., all) data types and/or one or more forms of inheritance for input and/or output (I/O or IO) semantics (e.g., for typing of I/O variables, return values and/or the like). For example, an input data buffer may be configured for integer values, and thus, a data structure based on the input data buffer may inherit the same data type (e.g. integer) and/or perform a data type conversion if possible.

In some embodiments, an intermediary format and/or IF language may implement a superset of one or more input formats and/or languages, for example, by implementing any functionality and/or features of one or more input formats and/or languages (e.g., conditionals, loops, dependencies, and/or the like).

In some embodiments, there may or may not be a one-to-one correspondence between instructions in an input representation of a workflow and instructions in an IF representation of the workflow. For example, an IF representation may include multiple instructions to implement a single instruction in the input representation. As another example, an IF representation may include a single instruction to implement multiple instructions in the input representation. As a further example, an IF representation may include multiple instructions to implement multiple instructions in the input representation without any direct correspondence between one or more (e.g., any) of the individual instructions in the input representation and/or the IF representation. Similarly, in some embodiments, there may or may not be a one-to-one correspondence between instructions in an IF representation of a workflow and an implementation of the workflow in a computational device.

Table 1 illustrates an embodiment of an IF representation of a computational workflow in accordance with example embodiments of the disclosure. The embodiment illustrated in Table 1 is intended to provide a human-readable example implementation of an intermediary format for purposes of illustrating the inventive principles. In some embodiments, a workflow may be created (e.g., directly) in an intermediary format, for example, using an IF language, especially an IF language that may be at least somewhat human-readable. In other embodiments, however, an IF representation may be implemented in a machine-readable form (e.g., a binary or other form) that may not necessarily be readily human-readable. In yet other embodiments, an input language (e.g., a dedicated input language) may be implemented to enable a user to create an IF representation of a computational workflow.

TABLE 1

| Line | Statement | Comments |
|---|---|---|
| 1 | input__args = arg1, arg2, arg3, arg4, arg5, arg6, arg7, lba1, lba2 | transpiler assigned names for arguments and/or logical block addresses in storage on device |
| 2 | device__programs = [prog1, matrix__sum], [prog2, matrix__mult] [prog3, matrix__fetch] | programs may be defined and/or translated inline, or may exist on device or in a library |
| 3 | hint__no__dep{ | hints at ability to parallize, transpiler determined and added, or converted from hint in source language |
| 4 | dev__buf1 = dev__alloc(arg1); | device memory allocation |
| 5 | dev__buf2 = dev__alloc(arg2); | device memory allocation |
| 6 | dev__buf3 = dev__alloc(arg3); | device memory allocation |
| 7 | device__copy(dev__buf1, arg4, arg1); | example where device buf, host buf, and size |
| 8 | load(dev__buf2, arg5, arg2); | example where dev buf, host buf, and size |

TABLE 1-continued

| Line | Statement | Comments |
|---|---|---|
| 9 | } | |
| 10 | device__exec(prog1, dev__buf1, dev__buf2, dev__buf3); | example with matrix 1, matrix 2, result matrix |
| 11 | device__exec(prog2, dev__buf3, dev__buf1, dev__buf1); | example with matrix 1, matrix 2, result matrix |
| 12 | dev__scalar1 = matrix__fetch[dev__buf1, arg7] | fetch an element from the matrix at the given index |
| 13 | branch(dev__scalar1, EQL, 5){ | if scalar is equal to 5, execute the first copy, otherwise the second |
| 14 | host__copy(host__address, dev__buf1); | copy from device buffer to host buffer |
| 15 | } | |
| 16 | { | |
| 17 | host__copy(host__address, dev__buf3); | copy from device buffer to host buffer |
| 18 | } | |

In some embodiments, a dev_alloc instruction may be used to allocate memory for one or more computational operations. For example, in an embodiment of a computational device in which computational resources may be implemented with an FPGA, the FPGA may share memory space with a device controller, embedded controller, and/or the like. In such an embodiment, the dev_alloc instruction may be used to allocate a portion of the shared memory space to the FPGA. In some embodiments, DMA may be used to transfer input and/or output data between a host and/or a computational device. In such an embodiment, a portion of host memory may be mapped to a portion of device memory. For example, one or more memory addresses for DMA may be routed based on an address range. Thus, the device may transfer data to and/or from a host by writing to an address that appears to be a local memory address within the device's memory space.

Figure 6:
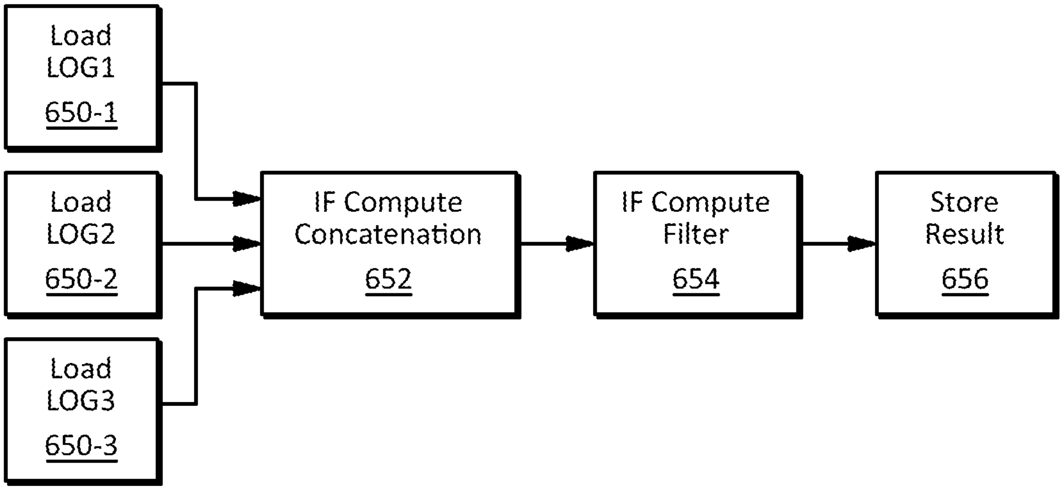
FIG. 6 illustrates a first embodiment of a workflow for a computational device in accordance with example embodiments of the disclosure.

FIG. 6 illustrates a first embodiment of a workflow for a computational device in accordance with example embodiments of the disclosure. The workflow illustrated in FIG. 6, which may be represented, for example, using an intermediary format, may be used to process a series of data logs (e.g., logs generated by a datacenter). An IF representation of the workflow may include a first IF load instruction to execute a first load operation 650-1, a second IF load instruction to execute a second load operation 650-2, and/or a third IF load instruction to execute a third load operation 650-3. At operation 650-1, an orchestrator (e.g., a compiler, an interpreter, an API, an adapter for an API, a hardware execution apparatus, and/or the like as illustrated in FIG. 4) may execute the first IF load instruction to cause one or more computational devices and/or one or more computational resources to load a first log LOG 1 into a memory location (e.g., device memory in a computational device) that may have been allocated to the workflow.

In embodiments in which an orchestrator may be implemented at least partially with an interpreter, the orchestrator may execute the first IF load instruction (and/or any other IF instructions described with respect to FIG. 6, FIG. 7, and/or any other embodiments disclosed herein) at least partially by sending a corresponding instruction to an embedded processor and/or other computational resource at a computational device.

In embodiments in which an orchestrator may be implemented at least partially with a compiler, the orchestrator may compile the first IF load instruction to one or more device format (e.g., native format) instructions. The orchestrator may send, install, download, and/or the like, the one or more device format instructions to, or in, one or more computational devices and/or one or more computational resources. The orchestrator, one or more computational devices and/or one or more computational resources may execute at least one or more of the device format instructions to load the first log LOG 1 into a memory location (e.g., in device memory). An orchestrator implemented at least partially with a compiler may compile and/or execute any other IF instruction described with respect to FIG. 6, FIG. 7, and/or any other embodiments disclosed herein) at least partially in a manner similar to that described above for the first IF load instruction.

In embodiments in which an orchestrator may be implemented at least partially with an API, the orchestrator may execute the first IF load instruction (and/or any other IF instructions described with respect to FIG. 6, FIG. 7, and/or any other embodiments disclosed herein) at least partially by invoking an API call for a computational device.

In embodiments in which an orchestrator may be implemented at least partially with an adapter for a computational device API, the orchestrator may execute the first IF load instruction (and/or any other IF instructions described with respect to FIG. 6, FIG. 7, and/or any other embodiments disclosed herein) at least partially by executing an instruction in a program, process, and/or the like for an adapter for a computational device API.

In embodiments in which an orchestrator may be implemented at least partially with a hardware execution apparatus, the orchestrator may execute the first IF load instruction (and/or any other IF instructions described with respect to FIG. 6, FIG. 7, and/or any other embodiments disclosed herein) at least partially by executing (e.g., directly) the first IF load instruction using hardware such as an embedded processor and/or one or more other compute resources at a computational device.

At operations 650-2 and 650-3, the orchestrator may execute the second and third IF load instructions to load the second log LOG 2 and third log LOG 3 into memory (e.g., device memory), respectively, in a manner similar to the first IF load instruction. At operation 652, the orchestrator may execute a first IF compute instruction to cause a computational resource at a computational device to perform a concatenate operation on LOG 1, LOG 2, and/or LOG 3 to generate a concatenated result which may be stored, for example, in device memory. At operation 654, the orchestrator may execute a second IF compute instruction to cause a computational resource at a computational device to perform a filter operation on the concatenated result from the first IF compute operation and/or store a filtered result, for example, in device memory.

At operation 656, the orchestrator may execute an IF store instruction to cause one or more computational devices and/or one or more computational resources to store the filtered result in a memory location (e.g., an output buffer at a host) that may have been allocated to the workflow.

Figure 7:
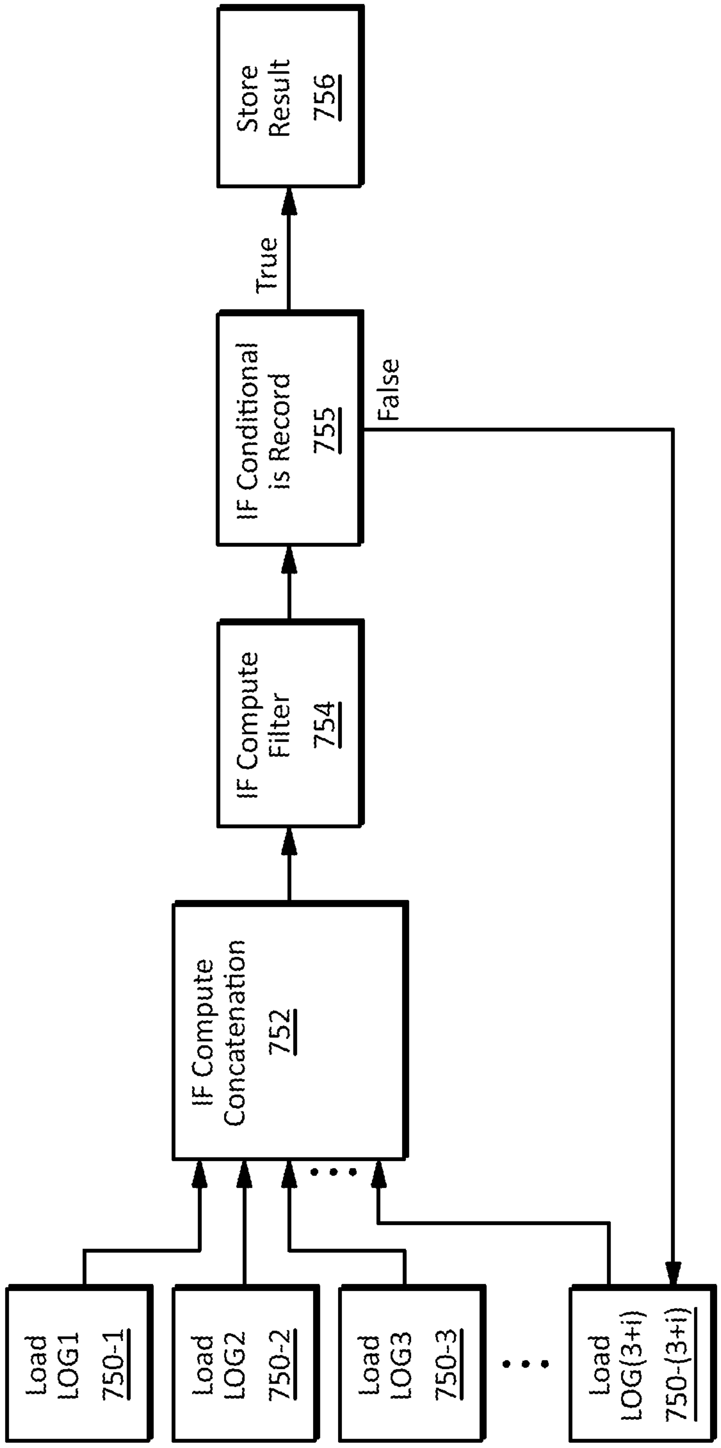
FIG. 7 illustrates a second embodiment of a workflow for a computational device in accordance with example embodiments of the disclosure.

FIG. 7 illustrates a second embodiment of a workflow for a computational device in accordance with example embodiments of the disclosure. The workflow illustrated in FIG. 7 may include one or more elements similar to those illustrated in the workflow illustrated in FIG. 6 in which similar elements may be indicated by reference numbers ending in the same digits. The workflow illustrated in FIG. 7, however, may include an IF conditional instruction to execute a conditional operation 755 to determine if the concatenated result includes a specific record requested by a user. If, at operation 755, the orchestrator determines that the requested record is included in the filtered result, the workflow may proceed to operation 756 where the orchestrator may execute an IF store instruction to cause one or more computational devices and/or one or more computational resources to store the filtered result and/or the requested record into a memory location (e.g., an output buffer at a host) that may have been allocated to the workflow. Additionally, or alternatively, at operation 756, the orchestrator may execute an IF instruction to notify a host that the workflow is completed.

If, however, at operation 755, the orchestrator determines that the requested record is included in the filtered result, the workflow may proceed to operation 750-(3+i) where the orchestrator may begin a loop to execute one or more additional IF load instructions to cause one or more computational devices and/or one or more computational resources to load one or more additional logs LOG (3+i) into a memory location (e.g., device memory in a computational device) that may have been allocated to the workflow, where the index i may be incremented each time through the loop. The workflow may proceed to operations 752 and/or 754 where the orchestrator may concatenate the next additional log LOG (3+i) to the previous concatenated result and/or filter the concatenated result to generate the next filtered result. At operation 755, the orchestrator may execute the IF conditional instruction to determine if the concatenated result includes the specific record requested by a user. The workflow may remain in a loop including operations 755, 750-(3+i), 752, and/or 754 until the requested record is found and/or a limit is reached on the amount of record data that may be concatenated, a maximum number of loop iterations is reached, and/or the like. In some embodiments, the concatenate operation 752 may be characterized as a non-fixed input compute element.

In some embodiments, an orchestrator may manage one or more memory locations for any of the workflows illustrated in FIG. 6, FIG. 7, and/or any other workflows described herein. In some embodiments, memory management may be based on one or more dependencies in a workflow. For example, referring to FIG. 7, one or more of the load operations 750-1, 750-2, . . . and/or concatenate operation 752 may use one or more memory blocks to store the log inputs LOG 1, LOG 2, . . . which may involve maintaining a list of memory block addresses in which the log inputs LOG 1, LOG 2, . . . may be stored, and therefore, may not be deallocated, for example, until the conditional operation 755 returns a true result, the workflow is completed, and/or the like. Additionally, or alternatively, the concatenated results may be moved to a shared buffer in a different memory location, and thus, one or more memory blocks used to store the log inputs LOG 1, LOG 2, . . . may be deallocated, for example, after a concatenate operation 752 is completed, however, one or more memory blocks used for the shared buffer may not be deallocated, for example, until the conditional operation 755 returns a true result, the workflow is completed, and/or the like.

In some embodiments, an input representation of a computational workflow may include one or more declarations, indications (which may also be referred to as hints), and/or the like, of dependencies to enable an orchestrator to manage memory for a workflow as described above. Additionally, or alternatively, in some embodiments, a format converter such as format converter 330 illustrated in FIG. 3, may build a table, chart, graph, and/or the like of dependencies, based on the input representation of a computational workflow, to enable an orchestrator to manage memory for a workflow as described above.

Figure 8:
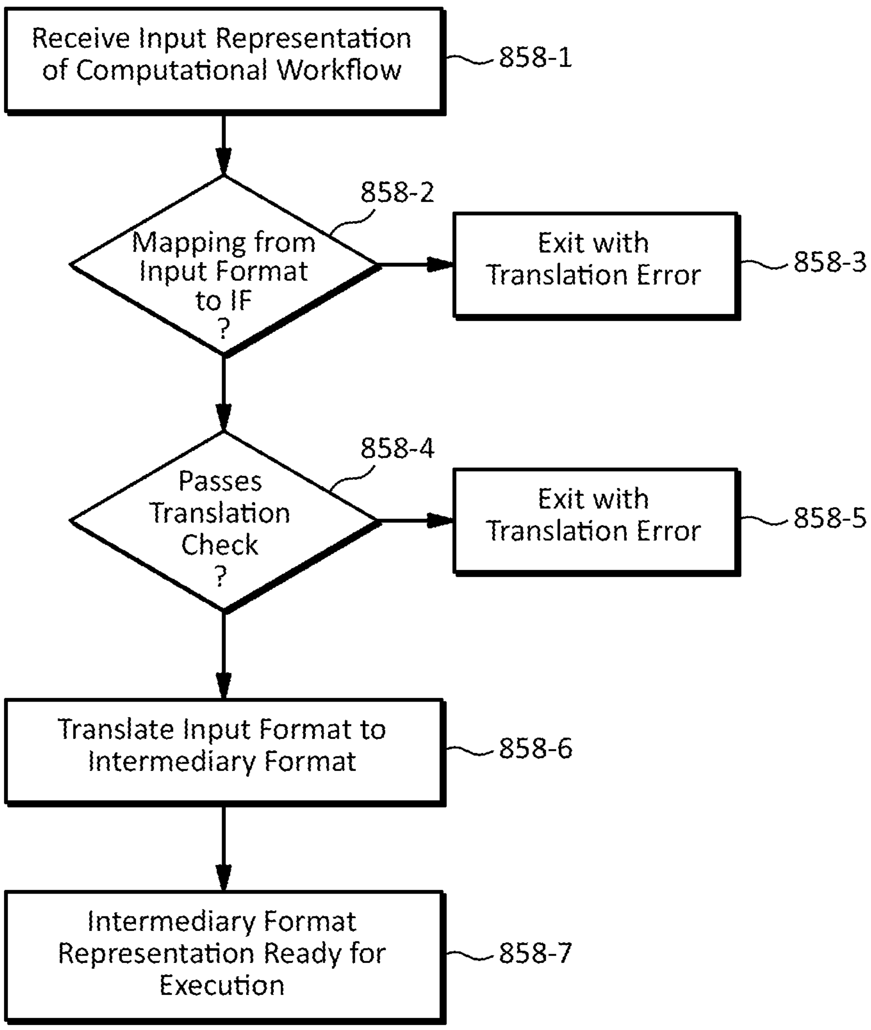
FIG. 8 illustrates an embodiment of a method for converting an input representation of a computational workflow to an intermediary representation of a computational workflow in accordance with example embodiments of the disclosure.

FIG. 8 illustrates an embodiment of a method for converting an input representation of a computational workflow to an intermediary representation of a computational workflow in accordance with example embodiments of the disclosure. The method illustrated in FIG. 8 may be performed, for example, by the format converter 330 and/or 530 illustrated in FIG. 3 and/or FIG. 5, which may also be referred to as a translator or transpiler.

Referring to FIG. 8, at operation 858-1, a translator may receive an input representation of a computational workflow. The input representation may be in any input format and/or input language for which a translator may include a mapping to an intermediary format. At operation 858-2, the translator may determine if the translator includes a mapping from the input format and/or input language to an intermediary format. If, at operation 858-2, the translator determines that it does not include a mapping from the input format and/or input language to an intermediary format, the method may proceed to operation 858-3 where the method may exit and/or return a translation error.

If, however, at operation 858-2 the translator determines that it includes a mapping from the input format and/or input language to an intermediary format, the method may proceed to operation 858-4 where the translator may perform a translation check. In some embodiments, a translation check may include, for example, one or more checks to determine if the input representation of the computational workflow includes one or more features that may not be supported by the translator. If, at operation 858-4, the translator determines that the input representation of the computational workflow fails the translation check, the method may proceed to operation 858-5 where the method may exit and/or return a translation error.

If, however, at operation 858-4 the input representation of the computational workflow passes the translation check, the method may proceed to operation 858-6 where the translator may translate (e.g., convert) the input representation of the computational workflow to an IF representation of the computational workflow. At operation 858-7, the method may end with the IF representation of the computational workflow ready for execution, for example, by an orchestrator such as one of the orchestrators illustrated in FIG. 4.

In some embodiments, an intermediary format may be used for computational devices, for example, to enable the use of multiple workflow languages on an application (e.g., input) side, and/or to provide a target language (e.g. an IF language) that may be secure, performant, and/or unified (e.g., allowing for consistency, standardization, or the like). In some embodiments, an intermediary format may enable the implementation of one or more features, for example, conditional operations, loop operations, exporting indications (e.g., hints) to an orchestrator, and/or providing limitations that may improve the security of computational devices, and/or reduce the time, effort, and/or the like, involved in implementing computational workflows, for example, with a computational device stack. In some embodiments, the use of an intermediary format may provide a mechanism for executing orchestration on a device side, a host side, or a combination thereof.

In some embodiments, an intermediary format and/or IF language may implement any number of the following features, have any number of the following characteristics, and/or provide any number of the following benefits: conditional operations, loop operations, graph flow (e.g., a state machine for computational workflows), availability (e.g., in existence), platform independence, visualization, active support (e.g., in active development), pervasiveness, ease of parsing, ability to receive and/or provide indications (e.g. hints) about dependencies, and/or the like.

In some embodiments, an intermediary format and/or IF language may function as a relatively low-level control language for computation devices and/or stacks. In some embodiments, an intermediary format and/or IF language may include a set of one or more instructions (e.g., instructions that may not be specific to an implementation of a computational device, one or more computational resources, and/or the like) that may, however, mirror a set of one or more instructions of a computational device and/or computational resource control flows (e.g., load, store, execute, and/or the like). In some embodiments, an intermediary format and/or IF language may be characterized as a computational device and/or computational resource byte code and/or an abstracted assembly language for computational devices and/or resources.

In some embodiments, a format converter may check a flow for correctness, adjustment (e.g., optimization), and/or the like, for example, as part of a process of converting an input representation of a computational workflow to an IF representation of a computational workflow. In some embodiments, an intermediary format and/or IF language may implement one or more converter and/or compiler limitations, for example, on a maximum loop depth which may be set, for example, based on a default, a user supplied value, and/or the like.

In some embodiments, a process for converting an input representation of a computational workflow to an IF representation of a computational workflow may include converting the text of an input representation to an abstract syntax tree which may follow one or more rules of the tree which may be implemented, for example, as a unidirectional tree that may reveal the root of an operation to a next operation.

Any of the functionality described herein, including any of the functionality that may be implemented with a host, a device, and/or the like or a combination thereof, the format converters 330, 530, and/or the like, orchestrators 449 (e.g., device format converter 436, CD API 440, adapter 442, hardware execution apparatus, 446, intermediary format interpreter 448, and/or the like), and/or the like, any of the computational resources 110, 210, and/or the like, as well as any of the functionality described with respect to the embodiments illustrated in FIGS. 1-11 may be implemented with hardware, software, firmware, or any combination thereof including, for example, hardware and/or software combinational logic, sequential logic, timers, counters, registers, state machines, volatile memories such DRAM and/or SRAM, nonvolatile memory including flash memory, persistent memory such as cross-gridded nonvolatile memory, memory with bulk resistance change, PCM, and/or the like and/or any combination thereof, CPLDs, FPGAs, ASICs, CPUs including CISC processors and/or RISC processors, GPUs, NPUs, TPUs, DPUs, and/or the like, executing instructions stored in any type of memory. In some embodiments, one or more components may be implemented as a system-on-chip (SOC).

Any of the hosts disclosed herein including hosts 102, 202, and/or any hosts that may implement any of the functionality described herein relating to intermediary formats and/or languages may be implemented with any component or combination of components including one or more of a client device, a server, a storage node, a CPU, a personal computer, a tablet computer, a smartphone, and/or the like.

Any of the computational devices disclosed herein including devices 104, 204, 404 (e.g., 404-1, 404-2, . . . ), and/or the like, may be implemented in any form factor such as 3.5 inch, 2.5 inch, 1.8 inch, M.2, Enterprise and Data Center Standard Form Factor (EDSFF), NF1, and/or the like, using any connector configuration such as Serial ATA (SATA), Small Computer System Interface (SCSI), Serial Attached SCSI (SAS), U.2, and/or the like. Any of the computational devices disclosed herein may be implemented entirely or partially with, and/or used in connection with, a server chassis, server rack, dataroom, datacenter, edge datacenter, mobile edge datacenter, and/or any combinations thereof.

Any of the devices disclosed herein that may be implemented as storage devices may be implemented with any type of nonvolatile storage media based on solid state media, magnetic media, optical media, and/or the like. For example, in some embodiments, a computational storage device may be implemented as an SSD based on not-AND (NAND) flash memory, persistent memory such as cross-gridded nonvolatile memory, memory with bulk resistance change, phase change memory (PCM), and/or the like, or any combination thereof.

Any of the communication connections and/or communication interfaces disclosed herein including communication connections 103 and/or 203, and/or communication interfaces 106 and/or 206 may be implemented with one or more interconnects, one or more networks, a network of networks (e.g., the internet), and/or the like, or a combination thereof, using any type of interface and/or protocol. Examples may include Peripheral Component Interconnect Express (PCIe), NVMe, NVMe-over-fabric (NVMe-oF), Ethernet, Transmission Control Protocol/Internet Protocol (TCP/IP), Direct Memory Access (DMA) Remote DMA (RDMA), RDMA over Converged Ethernet (ROCE), FibreChannel, InfiniBand, Serial ATA (SATA), Small Computer Systems Interface (SCSI), Serial Attached SCSI (SAS), IWARP, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), and/or the like, Advanced extensible Interface (AXI), any generation of wireless network including 2G, 3G, 4G, 5G, 6G, and/or the like, any generation of Wi-Fi, Bluetooth, near-field communication (NFC), and/or the like, or any combination thereof.

Figure 9:
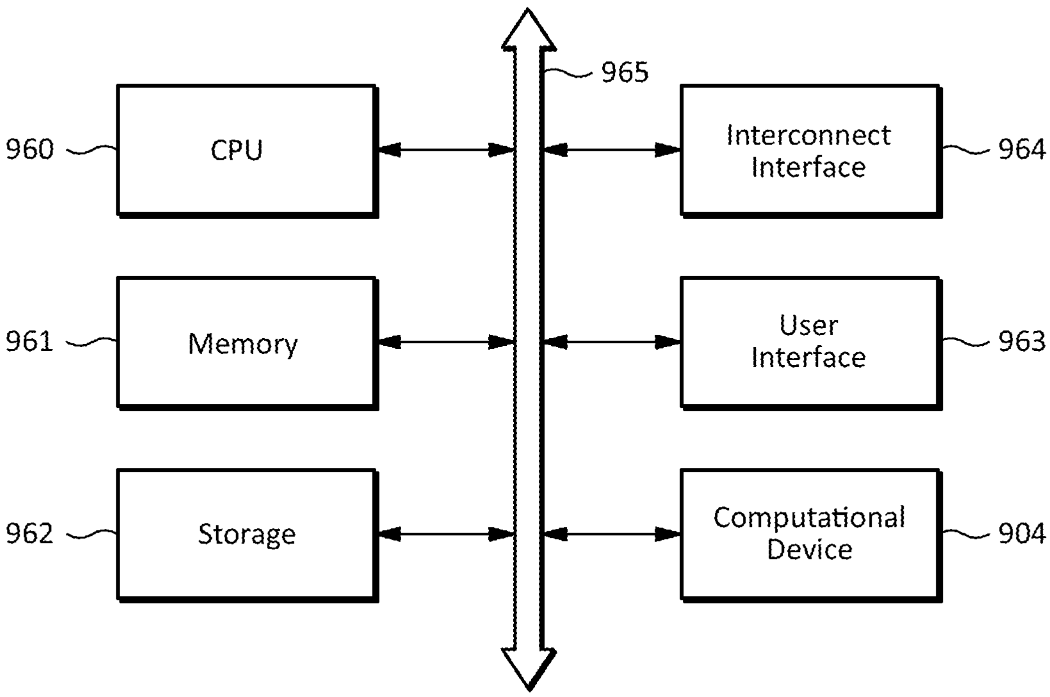
FIG. 9 illustrates an embodiment of a computing system in accordance with example embodiments of the disclosure.

FIG. 9 illustrates an embodiment of a computing system in accordance with example embodiments of the disclosure. The system illustrated in FIG. 9 may be used, for example, to implement any or all of the system, methods, and/or apparatus, or portions thereof, described herein. For example, the system illustrated in FIG. 9 may be used to implement a host, a computational device, and/or the like, as well as any of the format converters 330, 530, and/or the like, orchestrators 449 (e.g., device format converter 436, CD API 440, adapter 442, hardware execution apparatus, 446, intermediary format interpreter 448, and/or the like), combinations thereof, and/or portions thereof.

The system illustrated in FIG. 9 may include a central processing unit (CPU) 960, memory 961, storage 962, an interconnect interface 964, a user interface 963, and/or a computational device 904. In different embodiments, the system may omit any of these components or may include duplicates, or any additional numbers of, any of the components, as well as any other types of components to implement any of the methods and/or apparatus described in this disclosure.

In some embodiments, the interconnect interface 964 may be implemented with any type of general or storage interconnect such as SATA, SAS, NVMe, PCI, PCIe, and/or the like.

The CPU 960 may include any number of cores, caches, buses and/or interconnect interfaces and/or controllers. The memory 961 may include any arrangement of dynamic and/or static RAM, nonvolatile memory (e.g., flash memory) etc. The storage 962 may include hard disk drives (HDDs), solid state drives (SSDs), and/or any other type of data storage devices or any combination thereof. The user interface 963 may include any type of human interface devices such as keyboards, mice, monitors, video capture or transmission devices, microphones, speakers, touchscreens, and/or the like, as well as any virtualized or remote versions of such devices. In some embodiments, the system illustrated in FIG. 9 may include a network interface that may include one or more adapters or other apparatus to communicate through Ethernet, Fibre Channel, InfiniBand, TCP/IP, UDP/IP, RDMA, Wi-Fi, Bluetooth, or any other computer networking arrangement to enable the components to communicate through physical and/or logical networks, such as an intranet, the Internet, local area networks, wide area networks, etc.

Any or all of the components of the system illustrated in FIG. 9 may be interconnected through a system bus 965 which may collectively refer to various interfaces including power buses, address and data buses, high-speed interconnects such as Serial AT Attachment (SATA), Peripheral Component Interconnect (PCI), Peripheral Component Interconnect Express (PCI-e), System Management Bus (SMBus), and any other types of interfaces that may enable the components to work together, either locally at one location, and/or distributed between different locations.

The system illustrated in FIG. 9 may also include various chipsets, interfaces, adapters, glue logic, embedded controllers, such as programmable or non-programmable logic devices or arrays, application specific integrated circuits (ASICs), embedded computers, smart cards, and the like, arranged to enable the various components of the system 300 to work together to implement any or all of the methods and/or apparatus described in this disclosure. Any of the components of the system 300 may be implemented with hardware, software, firmware, or any combination thereof. In some embodiments, any or all of the components may be realized in a virtualized form and/or in a cloud-based implementation with flexible provisioning of resources, for example within a data center, or distributed throughout multiple data centers.

Figure 10:
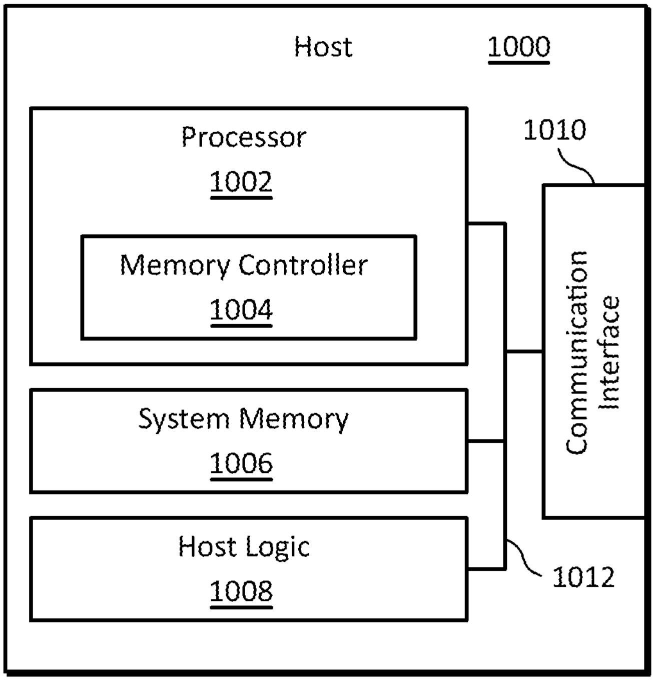
FIG. 10 illustrates an example embodiment of a host apparatus in accordance with example embodiments of the disclosure.

FIG. 10 illustrates an example embodiment of a host apparatus in accordance with example embodiments of the disclosure. The host apparatus illustrated in FIG. 10 may be used, for example, to implement any of the host functionality relating to intermediary formats disclosed herein. The host apparatus 1000 illustrated in FIG. 10 may include a processor 1002, which may include a memory controller 1004, a system memory 1006, host logic 1008, and/or a communication interface 1010. Any or all of the components illustrated in FIG. 10 may communicate through one or more system buses 1012. In some embodiments, one or more of the components illustrated in FIG. 10 may be implemented using other components. For example, in some embodiments, the host control logic 1008 may be implemented by the processor 1002 executing instructions stored in the system memory 1006 or other memory. In some embodiments, the host logic 1008 may implement any of the host functionality disclosed herein including, for example, implementing a format converter such as format converters 330 and/or 530, implementing an orchestrator such as any of the orchestrators 449, and/or the like.

Figure 11:
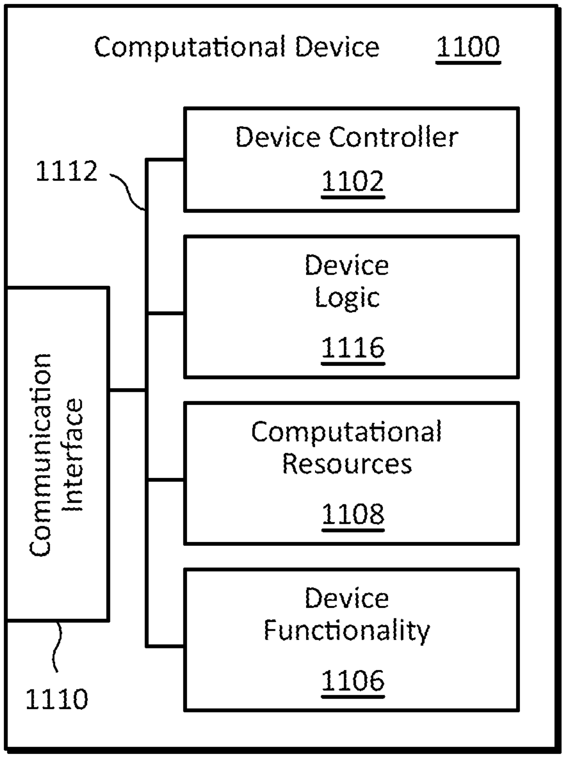
FIG. 11 illustrates an example embodiment of a computational device in accordance with example embodiments of the disclosure.

FIG. 11 illustrates an example embodiment of a computational device in accordance with example embodiments of the disclosure. The embodiment illustrated in FIG. 11 may be used to implement any of the device functionality relating to intermediary formats disclosed herein. The embodiment 1100 illustrated in FIG. 11 may be used, for example, to implement any of the computational devices disclosed herein. The computational device 1100 may include a device controller 1102, one or more computational resources 1108, device logic 1116, a device functionality circuit 1106, and a communication interface 1110. The components illustrated in FIG. 11 may communicate through one or more device buses 1112.

The device functionality circuit 1006 may include any hardware to implement the primary function of the device 1000. For example, if the device 1000 is implemented as a storage device, the device functionality circuit 1006 may include a storage medium such as one or more flash memory devices, an FTL, and/or the like. As another example, if the device 1000 is implemented as a network interface card (NIC), the device functionality circuit 1006 may include one or more modems, network interfaces, physical layers (PHYs), medium access control layers (MACs), and/or the like. As a further example, if the device 1000 is implemented as an accelerator, the device functionality circuit 1006 may include one or more accelerator circuits, memory circuits, and/or the like. In some embodiments, the device logic 1116 may be used to implement any of the device functionality disclosed herein including, for example, implementing a format converter such as format converters 330 and/or 530, implementing an orchestrator such as any of the orchestrators 449, and/or the like.

Figure 12:
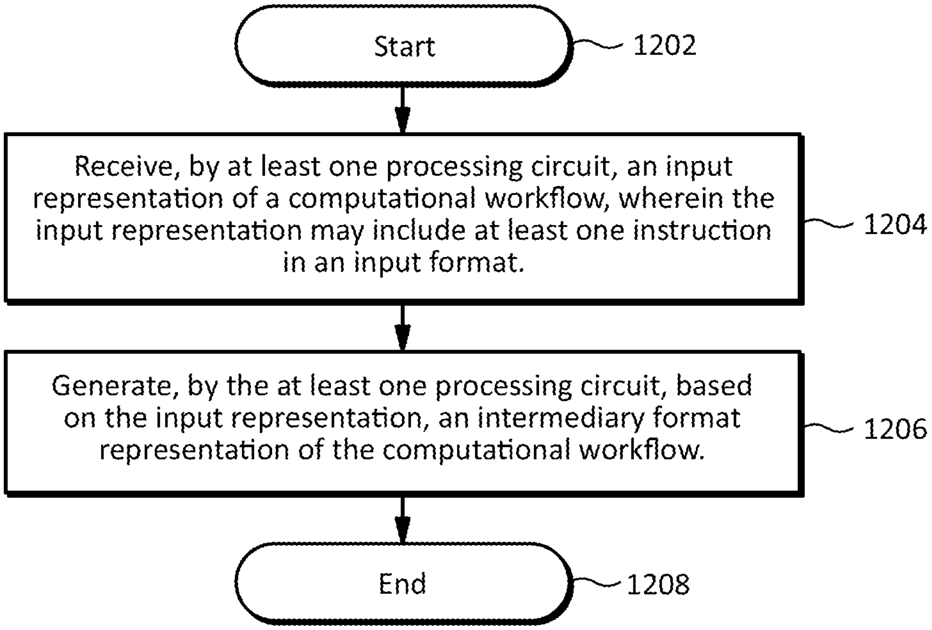
FIG. 12 illustrates an embodiment of a method for generating an intermediary format representation of a computational workflow in accordance with example embodiments of the disclosure.

FIG. 12 illustrates an embodiment of a method for generating an intermediary format representation of a computational workflow in accordance with example embodiments of the disclosure. The method may begin at operation 1202. At operation 1204, the method may receive, by at least one processing circuit, an input representation of a computational workflow, wherein the input representation may include at least one instruction in an input format. For example, an input representation of a computational workflow 332 illustrated in FIG. 3 may be written in a language such as C, Python, Java, and/or the like, and may be received, for example, as a file, a bitstream, stored in a memory buffer, and/or the like. At operation 1206, the method may generate, by the at least one processing circuit, based on the input representation, an intermediary format representation of the computational workflow. For example, a format converter 330 illustrated in FIG. 3 may include at least one processing circuit that may generate an intermediary format representation of the computational workflow 334. In some embodiments, the intermediary format representation may include at least one intermediary format instruction for a computational device such as any of the computational devices 404 illustrated in FIG. 4. The method may end at operation 1208.

Figure 13:
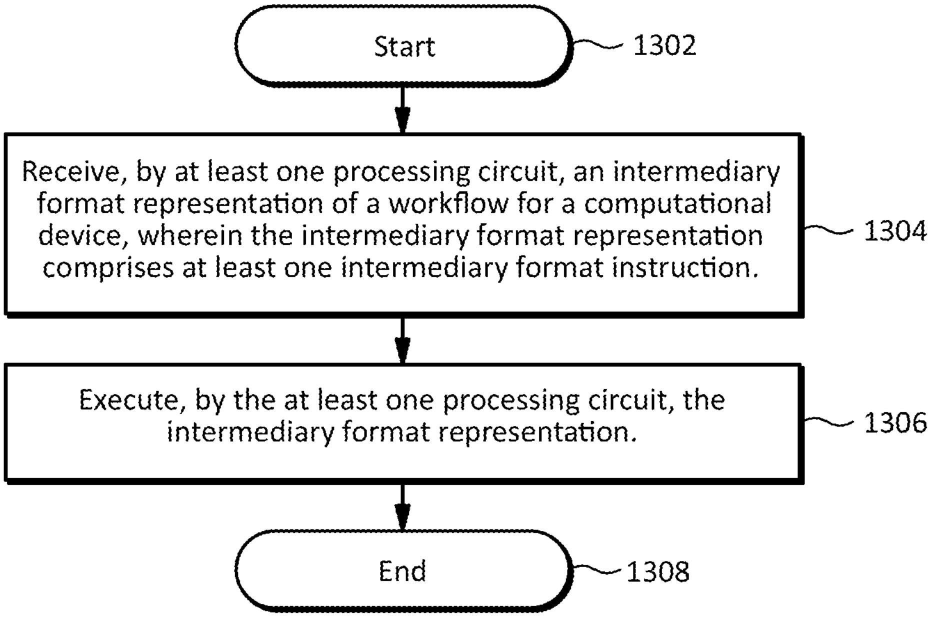
FIG. 13 illustrates an embodiment of a method for executing an intermediary format representation of a computational workflow in accordance with example embodiments of the disclosure.

FIG. 13 illustrates an embodiment of a method for executing an intermediary format representation of a computational workflow in accordance with example embodiments of the disclosure. The method may begin at operation 1302. At operation 1304, the method may receive, by at least one processing circuit, an intermediary format representation of a workflow for a computational device, wherein the intermediary format representation may include at least one intermediary format instruction. For example, an orchestrator such as one of the orchestrators 449 illustrated in FIG. 4 may include at least one processing circuit that may receive an intermediary format representation of a workflow 434. At operation 1306, the method may execute, by the at least one processing circuit, the intermediary format representation. For example, an orchestrator such as one of the orchestrators 449 illustrated in FIG. 4 may execute the intermediary format representation of a workflow 434 by compiling an IF representation, calling a CD API, operating an adapter for a CD API, executing the IF representation (e.g., directly) in hardware execution apparatus, interpreting the IF representation, and/or the like. The method may end at operation 1308.

The embodiments illustrated in FIG. 12 and FIG. 13, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner. The various details and embodiments described above may be combined to produce additional embodiments according to the inventive principles of this patent disclosure.

Since the inventive principles of this patent disclosure may be modified in arrangement and detail without departing from the inventive concepts, such changes and modifications are considered to fall within the scope of the following claims.

The invention claimed is:

1. A method comprising:

receiving an input representation of a workflow (WF) for a first computational device and a second computational device;

converting the input representation to an intermediary format (IF) representation of the WF, wherein the IF representation comprises an IF instruction;

executing, by a first IF interpreter, the WF by processing the IF instruction for the first computational device; and executing, by a second IF interpreter, the WF by processing the IF instruction for the second computational device, wherein the WF corresponds to one or more tasks to complete a process executable by one or more device format instructions at the first or second computational device, respectively, and includes at least configuring at least one of a device and a resource to perform one or more operations.

2. The method of claim 1, wherein the IF instruction comprises an instruction to perform at least one of a load operation, a store operation, or a computational operation.

3. The method of claim 1, wherein converting the input representation comprises generating the IF representation based on an arrangement of the WF.

4. The method of claim 1, further comprising:

using the IF representation, by an application programming interface following the first IF interpreter, as an input to operate the first computational device.

5. A method comprising:

receiving an intermediary format (IF) representation of a workflow (WF), wherein the IF representation comprises at least one (IF) instruction;

converting the IF representation to first and second device format representations for execution in first and second computational devices, respectively; and executing the WF using at least one of the first device format representation in the first computational device or the second device format representation in the second computational device, wherein the WF corresponds to one or more tasks to complete a process executable by one or more device format instructions at the first or second computational device and includes at least configuring at least one of a device and a resource to perform one or more operations.

6. The method of claim 5, wherein the executing the WF comprises generating, based on the IF representation, the one or more device format instructions.

7. The method of claim 6, wherein the first or second device format representations configures the first or second computational devices, respectively, for execution the WF.

8. The method of claim 6, further comprising sending the one or more device format instructions to a third computational device.

9. The method of claim 5, wherein:

the one or more device format instructions include a register-transfer level (RTL) code used to configure a programmable logic circuit.

10. The method of claim 5, wherein the executing the WF by the IF representation comprises communicating using an application programming interface for a third computational device.

11. The method of claim 5, wherein the executing the WF by the IF representation comprises modifying the IF instruction based on an application programming interface for a third computational device.

12. The method of claim 5, wherein the executing the WF by the IF representation comprises processing the IF instruction.

13. The method of claim 12, wherein processing the IF instruction comprises generating, based on the IF instruction, one or more device format instructions.

14. The method of claim 13, wherein processing the IF instruction further comprises sending the one or more device format instructions to the first or second computational device.

15. The method of claim 5, wherein executing the WF by the IF representation comprises executing the IF representation based on an arrangement of the WF.

16. The method of claim 5, wherein executing the WF by the IF representation comprises performing at least one of a load operation, a store operation, or a computational operation.

17. The method of claim 5, wherein executing the WF comprises executing the IF representation.

18. The method of claim 17, wherein:

executing the IF representation comprises providing a first result; and executing the IF representation comprises providing a second result.

19. An apparatus comprising:

a first computational device configured to receive an intermediary format (IF) instruction configured to execute a workflow via a first IF interpreter and an application programming interface, and execute the IF instruction; and a second computational device configured to receive the IF instruction via a second IF interpreter, and execute the IF instruction, wherein the workflow corresponds to one or more tasks to complete a process executable by one or more device format instructions at the first or second computational device and includes at least configuring at least one of a device and a resource to perform one or more operations.

20. The apparatus of claim 19, wherein:

the first or second computational device is configured to generate, based on the IF instruction, the one or more device format instructions; and the first or second computational device is configured to execute, at least in part, the IF instruction by executing, at least in part, the one or more device format instructions.

* * * * *